May 17, 1932.  E. I. SPONABLE  1,858,603
APPARATUS FOR PRINTING FROM A NEGATIVE SOUND RECORD TO A POSTIVE
Filed March 26, 1928
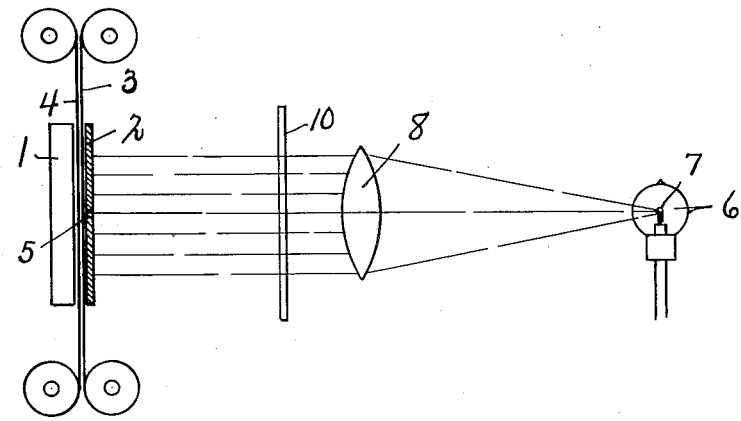
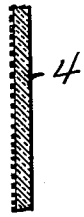  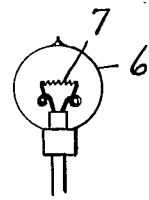

Patented May 17, 1932

1,858,603

UNITED STATES PATENT OFFICE

EARL I. SPONABLE, OF NEW YORK, N. Y.

APPARATUS FOR PRINTING FROM A NEGATIVE SOUND RECORD TO A POSITIVE

Application filed March 26, 1928. Serial No. 264,703.

This invention relates to certain new and useful improvements in apparatus for printing from a negative sound record to a positive.

It is found that when white or normal light from an electric lamp or arc is used for printing a positive sound record from a negative sound record, particularly at the high frequency portions of the record, that the exposure is such as to penetrate or practically penetrate the emulsion on the positive film element, the resultant lines constituting the positive record are blurred, and not clean cut, and are not a true shadow of the lines on the positive, and the object of this invention is to produce an accurate, sharply defined positive record, the lines of which are true shadows of the lines of the negative.

I have discovered that if the shorter wave length rays of light, such as blue or violet are used as the printing light that the exposure is such as not to penetrate the emulsion, but rather the exposure is mainly on the surface, and the resultant lines are clean cut, sharply defined shadows of the lines on the negative constituting the sound record, and from which the original sounds can be accurately reproduced.

Other objects and advantages relate to the details of the apparatus and the form and relation of the parts thereof, all as will more fully appear from the following description, taken in connection with the accompanying drawings, in which:—

Figure 1 is a diagrammatic illustration of an apparatus of this invention.

Figure 2 is illustrative mainly of a greatly enlarged section of a positive having a sound record thereon as produced by a normal printing light.

Figure 3 is a similar section of a film having a sound record thereon as produced by the improved character of light of this invention.

Figure 4 is an illustration of a suitable source of printing light.

The apparatus as shown comprises a gate consisting in this instance of two plates —1— and —2— which may be positioned in any suitable well known manner to permit the passage between them of a negative record element —3— and a positive —4— in overlying relation. One of the plates of the gate, as plate —2—, has a slit —5— formed therein of suitable width and length through which slit the negative —3— is exposed to light rays to thereby reproduce upon the positive a sound record element capable of reproducing the original sound recorded on the negative.

In effect the record upon the positive consists of accurate shadows of the lines on the negative.

In order to produce on the positive accurate shadows of the lines on the negative, there is utilized a line source of light —5— produced in any suitable manner, as for instance by a lamp —6— having a straight line filament —7— the filament extending substantially parallel with the negative —3—, and the light emanating from the straight line filament —7— is passed through a lens —8— or a suitable lens system for causing the rays of light to extend from the lens —8— in a direction normal to the negative —3— at the area where the negative moves past the slot —5—. The result is that lines of light are perpendicular to the negative and act, therefore, to produce on the positive accurate shadows of the lines on the negative without any spreading or overlapping, whereby an accurate reproduction of the sound record on the negative can be made upon the positive, and from which accurate reproduction of the original sounds can be effected.

The essential feature of this invention resides in the inter-position in the system, perhaps preferably between the lens or lens system —8— and the slotted plate —2—, of a color filter —10— of any suitable form and shape and adapted to permit the passage of only short wave length rays of light such as blue or violet to the slit —5—, so that the light actually passing through the slit —5— will be rays of short wave length, as stated, for instance either blue or violet. Color filters capable of accomplishing this result are well known, and in this instance may be in the form of a plate of glass of known constituents, capable of permitting the passage only of the desired rays of light, and being opaque to the rays of longer wave length.

An attempt has been made on an enlarged scale in Figure 3 to illustrate the fact that with the use of substantially white light, or such light as is normally emitted from an arc, the emulsion upon the positive is penetrated, or substantially penetrated, whereas by the use of rays of light of shorter wave length, as either blue or violet, only the surface portion of the emulsion is affected by the exposure, and a more accurate, sharply defined record is produced, and through which more light can be projected in reproduction and with a greater change between the light and dark lines upon the record, whereby more accurate and satisfactory reproduction of the original sounds can be effected, and altho I have shown and described a specific structure as constituting a perhaps preferred embodiment of the invention, I do not desire to restrict myself to the details of the same, as various changes and modifications may be made within the scope of the appended claims.

I claim:

1. An apparatus for printing from a negative sound record to a positive comprising a wall having an opening therein past which a negative and positive move in overlying relation, a source of light, means for causing rays of light from said source to pass through said opening in a direction normal to the negative, and means between the source of light and the negative which is opaque to rays of light of comparatively long wave length.

2. An apparatus for printing from a negative sound record to a positive comprising a wall having an opening therein past which a negative and positive move in overlying relation, a source of light, means for causing rays of light from said source to pass through said opening in a direction normal to the negative, and means permitting only rays of light of comparatively short wave length to pass to the negative from said source.

3. An apparatus for printing from a negative sound record to a positive comprising an opaque wall having an opening therein past which the negative and positive are adapted to move in overlying relation, a source of a line of light, means for causing the rays of light emanating from said source to pass through said opening in a direction substantially perpendicular to the negative, and means between the source of light and the negative for cutting out all the longer wave length rays of light.

4. An apparatus for printing from a negative sound record to a positive comprising a wall having an opening therein past which a negative and positive move in overlying relation, a source of light the rays of which project through said opening, means for causing rays of light from said source to impinge on negative in a direction normal to the negative, and means between the source of light and the negative which is opaque to rays of light of comparatively long wave length.

5. An apparatus for printing from a negative sound record to a positive comprising a wall having an opening therein past which a negative and positive move in overlying relation, a source of light the rays of which project through said opening, means for causing rays of light from said source to impinge on negative in a direction normal to the negative, and means permitting only rays of light of comparatively short wave length to pass to the negative from said source.

6. An apparatus for printing from a negative sound record to a positive comprising an opaque wall having an opening therein past which the negative and positive are adapted to move in overlying relation, a source of light the rays of which project through said opening, means for causing rays of light from said source to impinge on negative in a direction normal to the negative, and means between the source of light and the negative for cutting out all the longer wave length rays of light.

In witness whereof I have hereunto set my hand this 19th day of March, 1928.

EARL I. SPONABLE.